(12) United States Patent
Pirkenseer

(10) Patent No.: US 10,779,460 B2
(45) Date of Patent: Sep. 22, 2020

(54) DISTRIBUTING TOWER OF AN AGRICULTURAL DISTRIBUTING MACHINE AND METHOD FOR SERIES CUT-OFF ON SUCH A DISTRIBUTING TOWER

(71) Applicant: Horsch Maschinen GmbH, Schwandorf (DE)

(72) Inventor: Michael Pirkenseer, Schmidmuehlen (DE)

(73) Assignee: Horsch Maschinen GmbH, Schwandorf (DE)

( * ) Notice: Subject to any disclaimer, the term of this patent is extended or adjusted under 35 U.S.C. 154(b) by 224 days.

(21) Appl. No.: 15/764,035

(22) PCT Filed: Sep. 27, 2016

(86) PCT No.: PCT/EP2016/072962
§ 371 (c)(1),
(2) Date: Mar. 28, 2018

(87) PCT Pub. No.: WO2017/055266
PCT Pub. Date: Apr. 6, 2017

(65) Prior Publication Data
US 2018/0317379 A1 Nov. 8, 2018

(30) Foreign Application Priority Data

Sep. 28, 2015 (DE) .................... 10 2015 116 378

(51) Int. Cl.
*A01C 7/08* (2006.01)

(52) U.S. Cl.
CPC .............. *A01C 7/084* (2013.01); *A01C 7/087* (2013.01); *A01C 7/088* (2013.01)

(58) Field of Classification Search
CPC ........... A01C 7/084; A01C 7/081; A01C 7/08; A01C 7/00; A01C 7/087; A01C 7/088
See application file for complete search history.

(56) References Cited

FOREIGN PATENT DOCUMENTS

| DE | 1106711 C1 | 4/1992 |
| DE | 102005038216 A1 | 2/2007 |
| DE | 102013014386 A1 | 3/2015 |
| EP | 0642729 A1 | 3/1995 |
| EP | 0799560 B1 | 11/2000 |
| EP | 2695508 B1 | 5/2015 |

*Primary Examiner* — Christopher J. Novosad
(74) *Attorney, Agent, or Firm* — Erickson Kernell IP, LLC; Kent R. Erickson

(57) ABSTRACT

A distribution tower of an agricultural distribution machine for spreading granular material comprises a riser pipe supplying a flow of distribution goods to a ring-shaped distributor head for dividing the flow into a multitude of flows of distribution goods along the circumference of the distributor head. At least one of the outflows has a shut-off device. The shut-off device has a track switch operable to selectively guide the flow of distribution goods toward a seed tube or toward a return section. A return device connects to and surrounds the riser pipe. Openings in the riser pipe serve to receive the returned distribution goods. The return section, as well as the seed tube connection, are permanently, pneumatically connected. A method is also provided where it is possible to shut off an optional number of outflows without any resulting major change of the lateral distribution.

28 Claims, 8 Drawing Sheets

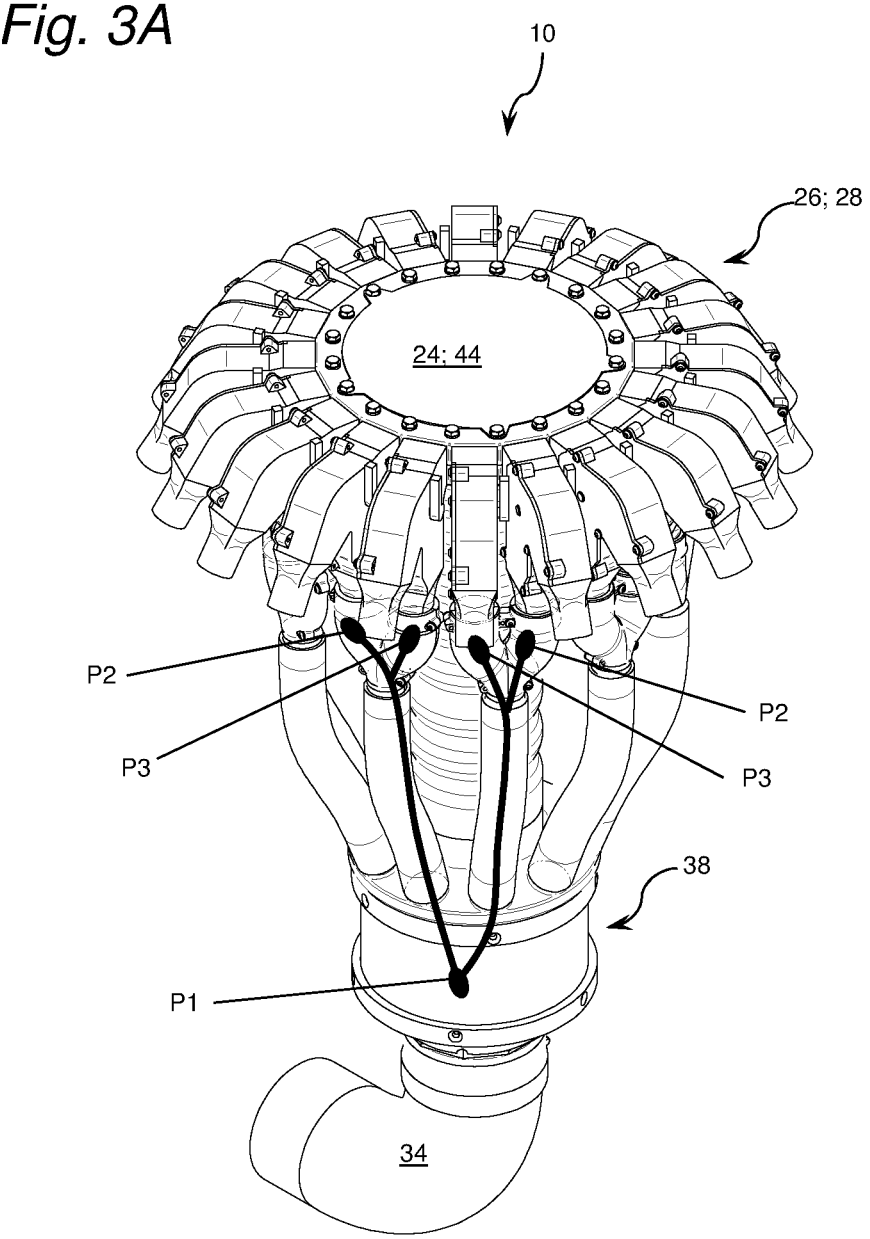

DISTRIBUTING TOWER OF AN AGRICULTURAL DISTRIBUTING MACHINE AND METHOD FOR SERIES CUT-OFF ON SUCH A DISTRIBUTING TOWER

CROSS-REFERENCE TO RELATED APPLICATION

This application claims priority from German patent application No. 102015116378.0 filed Sep. 28, 2015, the disclosure of which is hereby incorporated herein in its entirety by reference.

FIELD OF THE INVENTION

The present invention relates to a distribution tower of an agricultural distribution machine for spreading granular-type distribution goods, such as seeds, fertilizer, or the like, distribution tower. The invention moreover relates to a method for row shut-off on a distribution tower of an agricultural distribution machine.

BACKGROUND

Various different machines for spreading and distributing agricultural distribution goods, such as seeds, fertilizer, or the like, are known from the prior art in agricultural engineering. In a preferred embodiment, the granular-type distribution goods are carried along in a storage hopper of the machine or they are supplied, as the case may be, and the distribution goods are subsequently admixed by means of various different metering devices to an air volume flow that is usually generated by an air blower, thus resulting in an air volume flow of distribution goods. This air volume flow of distribution goods is subsequently conveyed to a distribution tower. The distribution tower generally has a circular distributor head associated with it that has a plurality of outflows along its circumference. In the distributor head, the one, central air volume flow of distribution goods is divided into a plurality of partial air volume flows of distribution goods corresponding in number to the number of outflows or rows, as the case may be. The distribution goods are guided by means of seed tubes to a multitude of downstream row units or, as the case may be, of spreading devices, such as sowing coulters or the like. In order to achieve a preferably even distribution of the distribution goods at all outflows or at all spreading devices, as the case may be, the distribution tower or the distributor head, as the case may be, must have a preferably uniform lateral distribution or a preferably low coefficient of variation, as the case may be, at the individual outflows; that is to say that the distribution goods should be distributed to all outflows as evenly as possible in the distributor head. Generally, the more uniform the air volume flows, the pressures, and also the flow velocities are in the distribution tower, in the distributor head, and in the outflows, the more uniform is the lateral distribution.

When distribution goods are being conveyed into all outflows or rows, as the case may be, and when the seed tubes are aligned to each other in terms of length, uniform air volume flows, pressures, and flow velocities are generally ensured. It may be necessary, however, to shut off individual outflows of the distributor head or to cut off conveying of distribution goods in the outflows, as the case may be, in order to create so-called tramlines, for example, or in order to prevent overlapping of the of distribution goods caused by spreading onto areas of a field that have already been tilled. It is, in addition, frequently difficult to align the lengths of the seed tubes to each other in a consistent manner, with the result that in practice, the lengths of the seed tubes can vary to a greater or lesser extent.

Thus, DE 10 2005 038 216 A1, for example, describes a distributor head where individual outflows can be in each case shut off by means of a slider. Switching off individual outflows, however, may cause the flow velocity in the outflows left open to become too high, thereby potentially impairing the lateral distribution when spreading the seeds or the distribution goods. This could be prevented by reducing the overall air volume flow, however, and this could in turn lead to the air volume flow no longer being sufficiently strong in the distribution tower, and to the distribution goods no longer being transported or the distribution tower becoming blocked. In this instance, the distribution goods are also distributed to a smaller number of outflows, again resulting in an increased amount rather than the desired spreading quantity being spread at the spreading devices. This could likewise be ameliorated by reducing the amount of distribution goods. However, such control for the machine is generally sluggish, and switching outflows or rows off and on quickly and frequently is therefore not possible; this in turn is not satisfactory, in particular in the context of section control or site-specific farming, which are increasingly desired in agriculture. Also, both the air volume flow and the amount of distribution goods can be reduced only to a certain degree or to a certain proportion. If the air volume flow and the amount of distribution goods are reduced by too much, the lateral distribution in turn will no longer be sufficiently precise.

A system in which switching off of individual outflows is intended to affect the air volume flows in the distribution tower as little as possible was proposed in EP 0 799 560 B1. A track switch is mounted per each of the outflows of a distributor head. By means of the track switch, the air volume flow of distribution goods can be guided either toward a spreading apparatus or toward a collector. In order to be able to let the air volume flow escape when deflecting the air volume flow of distribution goods, a bypass is disposed between the tube toward the spreading apparatus and the tube toward the collector. The intention is to thus achieve that neither the amount of distribution goods nor the air volume flow have to be reduced when individual outflows are switched off. The system provides for the distribution goods to be returned into the storage hopper, however, which has proved to be very parts-intensive. In order to achieve that the air volume flow can escape via the bypass when the distribution goods are returned into the collector, it is also necessary for a back pressure to prevail in the tube toward the collector. This back pressure may, again, not become too great, as the seeds could then escape via the bypass and would not be transported toward the collector. There are thus no uniform pressure levels and air volume flows in the distribution tower after switching off individual outflows in this system, neither, whereby the lateral distribution can in turn deteriorate and a section control system can also not be realized with this system.

A further system for switching off individual outflows at a distributor head has become known in EP 0 642 729 A1. The air volume flow of distribution goods can be controlled by means of a track switch either toward a spreading apparatus or toward a riser pipe of the distribution tower, and a funnel-shaped reception with a multitude of connecting spouts is mounted to the riser pipe for returning the distribution goods into the riser pipe. A hose is mounted in each case between the track switch and the connecting spouts.

Since both the distribution goods and the air volume flow are returned into the riser pipe in this embodiment, it is in turn necessary to reduce both the amount of distribution goods and the air volume flow. Reducing the air volume flow in turn results in different pressures in the distribution tower, whereby the lateral distribution deteriorates. In this instance, there is no possibility for emitting air by way of a bypass, for example, as there is in EP 0 799 560 B1.

EP 2 695 508 B1 describes a further development of EP 0 642 729 A1. In order to facilitate the return of distribution goods into the riser pipe, the hoses have been replaced by a funnel-shaped element that connects both to the track switches and to the riser pipe. No further elements are required. Since in this embodiment, too, both the distribution goods and the air volume flow are returned into the riser pipe, it is again necessary to reduce both the amount of distribution goods and the air volume flow. This reduction in turn results in different pressures in the distribution tower, whereby the lateral distribution deteriorates. In this instance, again, there is no possibility for emitting air by way of a bypass, for example, as there is in EP 0 799 560 B1.

It is also not desirable to emit air to the surrounding environment, because this can lead to bad air quality and/or air pollution on the one hand, and on the other hand can cause seeds to also escape into the surrounding environment, as the case may be. Uniform pressure levels are also not ensured in the distribution tower in this instance.

A further problem with the distribution towers or distribution machines, as the case may be, as known from the prior art is that the lateral distribution can vary according to the length of the mounted seed tubes, because the flow velocities in these tubes change according to the seed tube length. In order to counteract this problem, seed tubes of preferably the same length have been used up to now, however, this is difficult, if not impossible, to realize with distribution machines, in particular, that have a great working width with a large space between distribution tower and spreading apparatus.

Thus, a multitude of distribution towers with distributor heads is known from the prior art that each have a plurality of outflows or rows, as the case may be, disposed to be distributed along the circumference of the distributor head, which outflows or rows can in each case be switched off by means of track switches. The known distribution towers, however, in each case have the problem that the pressure levels, air volume flows, and flow velocities change, in each case, by switching off individual outflows and by returning distribution goods, whereby the lateral distribution deteriorates, and thus only a limited number of outflows can be switched off without causing blockages of the system or without causing the lateral distribution to deteriorate too much.

SUMMARY

The object of the present invention is therefore to provide a distribution tower of an agricultural distribution machine for spreading granular-type distribution goods, where cutting-off or switching off an optional number of outflows of the distribution tower leads to no perceptible deterioration or to only a slight deterioration of the lateral distribution, as the case may be, which distribution tower is insusceptible to blockages, and which is independent of external influences, such as different seed tube lengths. Another object of the present invention is to provide a method for row cut-off or row shut-off of a distribution tower of an agricultural distribution machine in order to thus achieve a section control system.

In order to fulfill the above-mentioned objects, the invention proposes a distribution tower of an agricultural distribution machine for spreading granular-type distribution goods, such as seeds, fertilizer, or the like. The distribution tower has a riser pipe by means of which the particular distribution goods to be spread are conveyed with the aid of an air volume flow toward a preferably ring-shaped distributor head connecting to the riser pipe. As a general rule, the riser pipe of the distribution tower runs approximately vertically or slightly inclined in relation to vertical and leads into the distributor head at the top, with the distributor head intended for providing branching and dividing of the air volume flow and the grain volume flow into a plurality or multitude of outflows. The distributor head has a plurality of outflows or rows, as the case may be, distributed along its circumference, by means of which outflows, the air volume flow of distribution goods that has been conveyed through the riser pipe and divided corresponding to the number of outflows in the distributor head is conveyed toward spreading devices, for example, being guided in the soil or near ground level, such as disk coulters, tine coulters, or the like. The air volume flow of distribution goods first passing through the riser pipe is thus divided in the distributor head into numerous partial air volume flows of distribution goods, with the number of the partial air volume flows of distribution goods corresponding to the number of outflows or rows to be supplied, as the case may be. At least one of the outflows or at least one row, as the case may be has a shut-off device associated with it, this shut-off device having a controllable track switch. By means of this controllable track switch, the particular partial air volume flow of distribution goods present in each of the outflows can be redirected toward a seed tube or toward a return section or a return device, as the case may be, with the return section or the return device, as the case may be, and the seed tube being pneumatically connected by means of a bypass. The mentioned controllable track switch can take various forms or designs, and can be designed, for instance, as a motor-adjustable flap or the like, where the motor adjustability can be achieved electromotively, pneumatically, or hydraulically. The track switch can also be optionally designed as a ball valve or the like, with the result that the partial air volume flow of distribution goods becomes adjustable and controllable, and does not have to be simply switched off or switched on, but can also be optionally modulated.

The return section leads into a return device that surrounds the seed tube or is part of the seed tube, as the case may be, with the seed tube having openings in the area of the return device, by means of which openings, the riser pipe as well as the return device are pneumatically connected. The riser pipe, the return device, the return section, the bypass, as well as the seed tube are thus permanently pneumatically connected, independently of the particular placing or position of the track switch, as the case may be. A pressure level P1 is thereby reached in the return device, for example, and a pressure level P2 and/or P3 is reached in the return section or in the bypass, as the case may be, with P1 being less than or equal to P2 and/or P3. These pressure levels prevail independently of the position of the track switch and also independently of the number of shut outflows, whereby an optional number of outflows can be shut, and whereby external influences, such as variable seed tube lengths or the like have no or only negligible effects on the lateral distribution of the agricultural distribution machine.

In order to improve this even more, further components of the distribution tower can in addition be permanently pneumatically connected in the corresponding manner, such as the distributor head, with the result that, for example, the riser pipe, the return device, the return section, the bypass, the seed tube, as well as the distributor head are permanently pneumatically connected, independently of the particular placing or position of the track switch, as the case may be.

The distribution tower according to the invention is preferably used in agricultural distribution machines, such as sowing machines. Such machines generally have a funnel-shaped storage hopper for storing and supplying the distribution goods to be spread. At the lowest position of the storage hopper, a metering device is associated with said storage hopper. The particular distribution goods to be spread are metered by means of the metering device in a desired amount into a duct system that has an air volume flow guided inside it. The air volume flow is generated by an air blower, for example, in the form of a radial blower or of a centrifugal blower or the like. The admixture of distribution goods to the air volume flow thus results in an air volume flow of distribution goods within the duct system. By means of said air volume flow of distribution goods, the distribution goods are conveyed at a flow velocity toward the distribution tower. In this context, the distribution tower first has, for example, a riser pipe running substantially vertically, to the top end of which riser pipe a distributor head connects, which distributor head has a plurality of outflows or rows disposed evenly around its circumference, as the case may be. In the distributor head, the air volume flow of distribution goods undergoes a change of direction, for example, from a vertical movement along the riser pipe to a horizontal movement toward the outflows, whereby the one air volume flow of distribution goods is divided into a plurality of partial air volume flows of distribution goods corresponding in number to the number of outflows.

There can be a shut-off device disposed at or downstream from at least one of the outflows, as the case may be. Said shut-off device consists of at least one seed tube connection, to which a seed tube can be mounted, by means of which the distribution goods are transported toward spreading devices that are being guided near ground level or in the soil, such as disk coulters, tine coulters, or the like. The shut-off device furthermore has a return section, for example in the form of a return connection or a return opening, as the case may be, which is in turn connected to a return device, by means of which return device the distribution goods are conveyed or guided back into the riser pipe, as the case may be. Whether the distribution goods are guided toward the seed tube or toward the return section can be controlled by a track switch that is preferably present in or integrated into the shut-off device.

The shut-off device can be designed as a separate part that is mounted at the outflows of the distributor head. The shut-off device or, in particular, the track switch, as the case may be, can likewise be integrated into the distributor head, and the track switch can be formed as controllable flap, for example, or also as ball valve or the like. The track switch is preferably motor-adjustable or motor-controllable. In such an embodiment, the base surface, for example, of the distributor head can have return openings corresponding in number to the number of outflows or track switches, as the case may be, with the return openings serving as return sections. A return device in the form of a funnel, for example, could connect to the return opening.

The return device can be designed in various different ways. It would thus be conceivable for the return device to be formed as a pipe surrounding the riser pipe, where the riser pipe has openings in the area of the return device, whereby the riser pipe as well as the return device are pneumatically connected. Moreover, the distribution goods can be conveyed or guided from the return device back to the riser pipe by way of the openings. In addition, a plurality of spouts can be mounted to the return device, preferably along the circumference, with return tubes in turn connecting to the return devices, and with the return tubes establishing a connection between the return section and the return device. The return device could moreover be formed in a funnel shape surrounding the riser pipe and leading into the riser pipe in the area of the openings on the one hand, and into the return section on the other hand, with such a design substantially reducing the input of parts.

It can be provided that a collecting piece and/or a return tube and/or a funnel-shaped element connects to the return section, thus forming a return device and/or leading into said return device.

The return section can be designed in various different ways. The return section can thus be designed as a return opening, for example, which is formed in the base surface of the distributor head, for example, or into the base surface of one of the outflows or of the shut-off device, as the case may be. The shut-off device can also have a return connection that serves as a return section. Similarly, the return section and the return device could form a unit, in particular if the return device is designed as a funnel-shaped element, the bottom end of which leads into the riser pipe in the area of the openings, for example, and the top end of which leads into the distributor head or the shut-off device in the area of the return openings. A return tube could, however, also connect to the return section by means of a return connection, with the return tube leading into the return device. Two or more return sections could also be connected or coupled by means of a collecting piece, and a return tube could in turn connect to the collecting piece.

The riser pipe can moreover have a nozzle. In this instance, the cross section of the riser pipe first tapers conically in the area of said nozzle and subsequently widens conically to the original cross section. It can be provided that the riser pipe has at least one nozzle with the nozzle having openings associated with it in the area of the smallest cross section, which openings establish a pneumatic connection with the return device. Other locations for the openings in the riser pipe would, however, also be conceivable. By way of this nozzle, it is intended to first center the air volume flow of distribution goods in the riser pipe, thus conveying the air volume flow of distribution goods more evenly toward the distributor head. If the openings are in the nozzle area with the smallest cross section, this has the further advantage that a type of injector principle results hereby, that is to say that a suction effect is created at the openings, whereby the seed return into the riser pipe can be improved. Centering of the air volume flow of distribution goods can be further improved by a so-called corrugated pipe disposed downstream from the nozzle. Along said corrugated pipe run, for example, a number of cross section reductions, for example in the form of recesses or corrugations of a small diameter. The riser pipe could also be composed of at least two consecutively arranged nozzles. The individual sections of the corrugated pipe can be in each case connected by way of welding or by clamps, for example. The sections can moreover be formed from a metallic or from a non-metallic material. The riser pipe could be manufactured in one piece and made from plastic material, for example.

A preferably circular distributor head connects to the riser pipe. Said distributor head can have, for example, a mushroom-shaped cover surface, a flat cover surface, a conical cover surface, or the like. By means of the air volume flow, the distribution goods being conveyed through the riser pipe are conveyed against, among others, said cover surface, and redirected by the cover surface toward the outflows or rows, as the case may be, that are disposed along the circumference of the distributor head. The more uniform this distribution between the outflows is, the more uniform is the lateral distribution of the distribution goods of the agricultural distribution machine. The lateral distribution depends, among other things, on the flow velocities in the particular outflows, and said flow velocities in turn depend on the length of the connected seed tubes, for example, and also on the position of the track switch, that is to say, whether the track switch is shut and the distribution goods are being conveyed toward the return section or whether the track switch is open and the distribution goods are being conveyed toward the seed tube. Based on the number of shut track switches, this process can in turn accordingly deteriorate. For example, if only one track switch of a distribution tower with 20 outflows is shut, the effect on the flow velocities and on the lateral distribution will be imperceptible. If, however, two, three, or more outflows are shut off, the result will be a perceptible change of the flow velocities and thus a deterioration of the lateral distribution. In order to counteract this problem, the invention provides that the return section, the return device, as well as the seed tube connection are permanently pneumatically connected in each case for all outflows or for all shut-off devices, as the case may be. This is preferably achieved via a bypass.

The bypass can be designed in various different ways. According to one further development of the invention, the bypass can be formed, for example, by the track switch having slits, holes, or the like openings, by means of which a permanent pneumatic connection between the return section and the seed tube connection is established. Such slits, holes, or the like openings could also be disposed in a partition wall between the return section and the seed tube connection. In a similar manner, such slits, holes, or the like openings could be disposed in a partition wall between the funnel-shaped return device and the seed tube connection, for example. The slits, holes, or the like openings are in this context in each case dimensioned such that a sufficient air volume flow can escape through the bypass openings, however not the distribution goods. It could also be conceivable, for example, that the track switch is swiveled between the open and the shut position in such a manner that a desired air volume flow can in each case escape through a resulting opening between the track switch and the housing of the distributor head or between the track switch and the shut-off device, as the case may be. Furthermore, the bypass could be formed as pipeline or tubing.

In a preferred embodiment, the bypass is integrated into the shut-off device or into the distributor head, as the case may be, in the form of an air channel. In this context, the shut-off device can provide a flange surface, for example, so that the shut-off device can be mounted to the outflows of the distributor head by means of said flange surface. For this purpose, various latching members or hooks or the like mounting elements can be associated with the flange surface. The shut-off device furthermore has a return section, for example in the form of a return connection, and also a seed tube connection, where the return section can be composed of a return channel and a return connection, which return connection, for example, connects at a right angle to the flange surface, and where a seed channel can be disposed between flange surface and seed tube connection. Again, said two channels can be disposed at an angle to each other that is 90°, for example. A pivotable track switch is disposed between the seed channel and the return channel, by means of which pivotable track switch, the air volume flow of distribution goods can in each case be redirected between the channels or the connections, as the case may be. The flange surface, the return connection, and also the seed tube connection preferably have essentially the same outer diameter of, for example, 30 millimeters, while they can also have other diameters and diameters that differ from each other.

The seed channel and the return channel can be disposed at right angles to each other, and the seed channel can in turn be disposed to be horizontal to the flange surface and the return channel can be disposed parallel to the flange surface. The bypass can extend in some sections as an air channel parallel to the seed channel and/or to the return channel, thereby pneumatically connecting the return section or the return connection, as the case may be, to the seed tube connection.

In this instance, the bypass is preferably disposed such that it forms a separator or a separating section, as the case may be, for example in the form of a deflection separator. Other separator systems, such as a cyclone separator, can also be used in this context. The deflection separator in this instance preferably has an angle of at least 90°, preferentially, however, at least 135°, in particular, however, approximately 180°, so that the air volume flow can proportionately escape via the bypass, whereas the distribution goods are prevented from escaping via the bypass. The degree of separation has to be as high as possible in this context, so that the distribution goods are guided back toward the return section into the riser pipe when the track switch is shut, while the air volume flow, however, can escape via the bypass toward the seed tube connection. The separation of distribution goods from a part of the air volume flow is achieved by way of the separating section.

Independently of the embodiment, the bypass in particular has a cross section that is selected such that the flow resistance is, as far as possible, the same for the bypass with the track switch shut as for the seed tube with the track switch open. With the bypass being designed as pipe, hose, or air channel, for example, the cross section or the width of the bypass, as the case may be, is for example 30 millimeters, or 25 millimeters, or 20 millimeters. The slits and/or holes and/or openings that are, for example, present in the track switch are also selected accordingly. It is hereby achieved that a sufficient amount of air volume can at all times escape via the bypass.

The pivoting of the track switch is carried out by means of an electric and/or pneumatic and/or hydraulic and/or the like actuator, while the control of said actuator is in turn carried out by means of a computer unit that is present at the distribution machine. The computer unit can transmit corresponding signals to the actuator by manual input from an operator, for example, or based on GPS data. A section control system, for example, could thus be supplied, where individual outflows are optionally connected or disconnected independently of each other; the present invention further enables site-specific farming, since disconnecting or connecting, as the case may be, of an optional number of outflows no longer has any effects on the lateral distribution of the distribution machine. This can be further improved by short travel paths of the track switch or by correspondingly fast actuators, as the case may be. The distribution tower according to the invention thus enables any number of outflows to be accordingly connected or disconnected sufficiently fast, thereby providing an application section control. The air volume flow of distribution goods can be conveyed according to the position of the track switch; with an open position, it can be conveyed toward the seed tube connection as well as toward a spreading device, and with a shut position, it can be conveyed via the return section and the return device toward the riser pipe.

In addition, a sensor, for example in the form of an impact sensor or of an optical sensor, can be associated with the shut-off device, the seed tube, and/or the return section, with the amount of passing grains of the distribution goods being determined by means of said sensor. The sensor values can, in particular, be used for controlling the position of the track switch accordingly, that is to say that if the sensor determines that a desired amount of distribution goods has been exceeded, the track switch shuts or assumes a position, as the case may be, where more distribution goods are guided toward the return section, and vice versa.

According to the invention, the riser pipe—preferably in the area of the nozzle—, the return device, and the return section, as well as the seed tube connection or the seed tube, as the case may be, are permanently pneumatically connected in the distribution tower by means of the bypass, independently of the position of the track switch. A pressure level P1 is thus reached in the return device, and a pressure level P2 and/or P3 is reached in the area of the bypass or in the area of the seed tube connection, as the case may be, with P1 being less than or equal to P2 and/or P3. These pressure levels prevail independently of the position of the track switch and also independently of external influences, such as seed tube lengths or the like, whereby the lateral distribution is maintained at all times substantially uniform, and whereby a row shut-off, preferably a single-row shut-off, is realized independently of the number of shut outflows or track switches, as the case may be.

Instead of a shut-off device, it would be possible to use a pressure compensation device in a further embodiment of the distribution tower according to the invention. Said pressure compensation device has only one bypass, which establishes a connection between the return device and/or riser pipe and the seed tube. In this instance, the bypass could be designed as a pipe or hose or the like. In this manner, too, a pressure level P1 is thus reached in the return device or in the riser pipe, as the case may be, and a pressure level P2 and/or P3 is reached in the seed tube, with P1 being less than or equal to P2 and/or P3.

Such a pressure compensation device could be used, in particular, in combination with one or more shut-off devices, so that only a certain number of outflows of a distribution tower, for example, are provided with shut-off devices, and the remaining outflows are provided with pressure compensation devices. The benefit herefrom would be that the distribution tower would still have all advantages of the pressure levels and air volume flows that are reached, but could be constructed in a simpler manner, since only a small number of track switches with corresponding actuators would be required.

It should additionally be noted that the track switch could be realized in various different ways, for example as a flap. Other embodiment types are, however, also conceivable; the track switch could thus operate according to a ball valve principle, for example, and it could be designed as a sphere or cone, for example, with the deflection of the air volume flow of distribution goods being achieved by rotation of the sphere or of the cone, as the case may be.

In order to fulfill the above-mentioned object, the invention further proposes a method for row shut-off, in particular for single-row shut-off at a distribution tower of an agricultural distribution machine for spreading granular-type distribution goods, such as seeds, fertilizer, or the like. The distribution tower has a riser pipe by means of which the particular distribution goods to be spread are conveyed with the aid of an air volume flow toward a preferably ring-shaped distributor head connecting to the riser pipe. The distributor head has a plurality of outflows or rows, as the case may be, distributed along its circumference, by means of which outflows the air volume flow of distribution goods that has been conveyed through the riser pipe and divided corresponding to the number of outflows in the distributor head is conveyed toward spreading devices, for example, being guided in the soil or near ground level, such as disk coulters, tine coulters, or the like. Each of the outflows or each row, as the case may be, has a shut-off device associated with it. The shut-off device has a track switch. By means of said track switch, the partial air volume flow of distribution goods that is present in the outflows or rows, as the case may be, can be redirected toward a seed tube or toward a return section, with the return section and/or the return device as well as the seed tube being permanently pneumatically connected by means of a bypass. The return section leads into a return device that surrounds the seed tube or is part of the seed tube, as the case may be, with the seed tube having openings in the area of the return device, by means of which openings the riser pipe as well as the return device are pneumatically connected. The riser pipe, the return device, the return section, the bypass, as well as the seed tube are thus permanently pneumatically connected, independently of the position of the track switch. A pressure level P1 is thereby reached in the return device, for example, and a pressure level P2 and/or P3 is reached in the area of the bypass, with P1 being less than or equal to P2 and/or P3. Said pressure levels prevail independently of the position of the track switch and also independently of the number of shut outflows, whereby it is achieved that an optional number of outflows can be shut, and that external influences, such as seed tube lengths or the like have no or effect on the lateral distribution of the agricultural distribution machine, thus enabling a single-row shut-off.

The pivoting of the track switch—that is formed, for example, by a pivotable flap or by a ball valve or the like—is carried out by means of an electric and/or pneumatic and/or hydraulic and/or the like actuator, while the control of said actuator is in turn carried out by means of a computer unit that is present at the distribution machine. The computer unit can transmit corresponding signals to the actuator by manual input from an operator, for example, or based on GPS data. A section control system, for example, could thus be supplied, where individual outflows are optionally connected or disconnected independently of each other; and this can be further improved by short travel paths of the track switch or by correspondingly fast actuators, as the case may be. The distribution tower according to the invention thus enables any number of outflows to be accordingly connected or disconnected sufficiently fast, thereby providing an application of section control. The air volume flow of distribution goods can be conveyed according to the position of the track switch; with an open position, it can be conveyed toward the seed tube connection as well as toward a spreading device, and with a shut position, it can be conveyed via the return section and the return device toward the riser pipe.

In addition, a sensor, for example in the form of an impact sensor or of an optical sensor, can be associated with the shut-off device, the seed tube, and/or the return section, with the amount of passing grains of the distribution goods being determined by means of said sensor. The sensor values can, in particular, be used for controlling the position of the track switch accordingly, that is to say that if the sensor determines that a desired amount of distribution goods has been exceeded, the track switch shuts or assumes a position, as the case may be, where more distribution goods are guided toward the return section, and vice versa.

In the distribution tower, the riser pipe—preferably in the area of the nozzle—, the return device, and the return section—which is preferably designed as return tube and/or return tube connection and/or as a return opening—, as well as the seed tube connection or the seed tube, as the case may be, are thus permanently pneumatically connected by means of the bypass, independently of the position of the track switch. A pressure level P1 is thus reached in the return device, and a pressure level P2 and/or P3 is reached in the area of the bypass or in the area of the seed tube connection, as the case may be, with P1 being less than or equal to P2 and/or P3. These pressure levels prevail independently of the position of the track switch and also independently of external influences, such as seed tube lengths or the like, whereby the lateral distribution is maintained at all times substantially uniform, and whereby a preferably a single-row shut-off is realized independently of the number of shut outflows or track switches, as the case may be.

In order to further improve the lateral distribution, the amount of distribution goods metered from the metering device into the duct system can be reduced in each case depending on the number of shut outflows, where this may only be necessary from a certain number of shut outflows onward, for example from five outflows onward.

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

BRIEF DESCRIPTION OF THE DRAWINGS

FIG. 3A shows a perspective view of a further embodiment variant distribution tower.

DETAILED DESCRIPTION OF THE INVENTION

Figure 1:
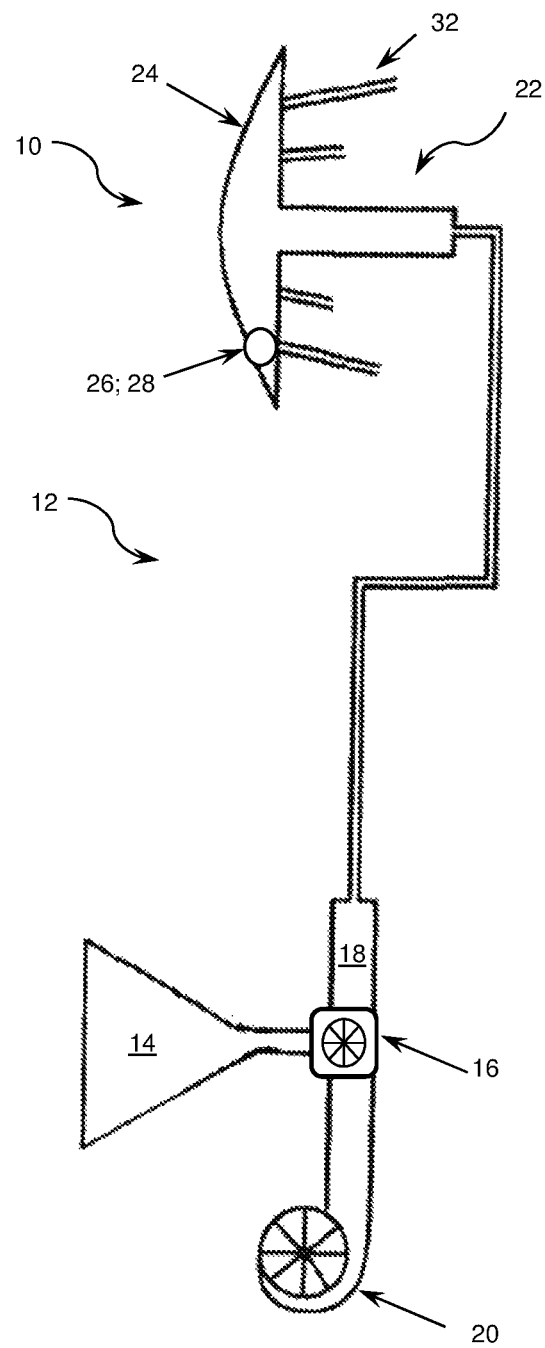
FIG. 1 shows a schematic view of an agricultural distribution machine.

The same or equivalent elements of the invention are each designated by the same reference characters in the FIGS. 1 to 5. Furthermore and for the sake of clarity, only the reference characters relevant for describing the individual figures are provided. It should be understood that the detailed description and specific examples of the embodiments of the apparatus or of the method according to the invention are intended for purposes of illustration only and are not intended to limit the scope of the invention.

FIG. 1 shows a distribution tower 10 that is built into an agricultural machine 12 in a schematic view. Said machine is a sowing machine such as is used for distributing granular-type distribution goods, like seeds, fertilizer, or the like. The machine has a storage hopper 14 for storing and supplying the particular distribution goods to be spread. The storage hopper 14 is designed to be funnel-shaped, with a metering device 16 being associated with it at the lowest position of the storage hopper 14. The particular distribution goods to be spread are evenly metered by means of the metering device 16 in a desired amount into a duct system 18 that has an air volume flow guided inside it. The air volume flow is generated by means of an air blower 20 that is likewise associated with the duct system 18. An air volume flow of distribution goods results from the admixture of distribution goods to the air volume flow. The distribution goods are conveyed by means of the air volume flow via the duct system 18 toward the distribution tower 10. In this context, the distribution tower 10 first has a vertically running riser pipe 22, to the top end of which a distributor head 24 connects, which distributor head 24 has a plurality of outflows 26 disposed evenly around its circumference. In the distributor head 24, the air volume flow of distribution goods first undergoes a change of direction from a movement along the riser pipe 22 to a movement toward the outflows 26, in which context the individual, central air volume flow of distribution goods is divided into a plurality of partial air volume flows of distribution goods corresponding in number to the number of outflows. A shut-off unit 28 that is schematically illustrated here with a track switch 30 that is not illustrated here is associated with at least one of the outflows 26. In each case at least one seed tube 32 is disposed at the outflows or rows 26, as the case may be, by means of which seed tube 32, the distribution goods are transported from the distributor head 24 toward spreading devices (not illustrated here) that are being guided near ground level or in the soil, such as disk coulters, tine coulters, or the like.

Figure 2A:
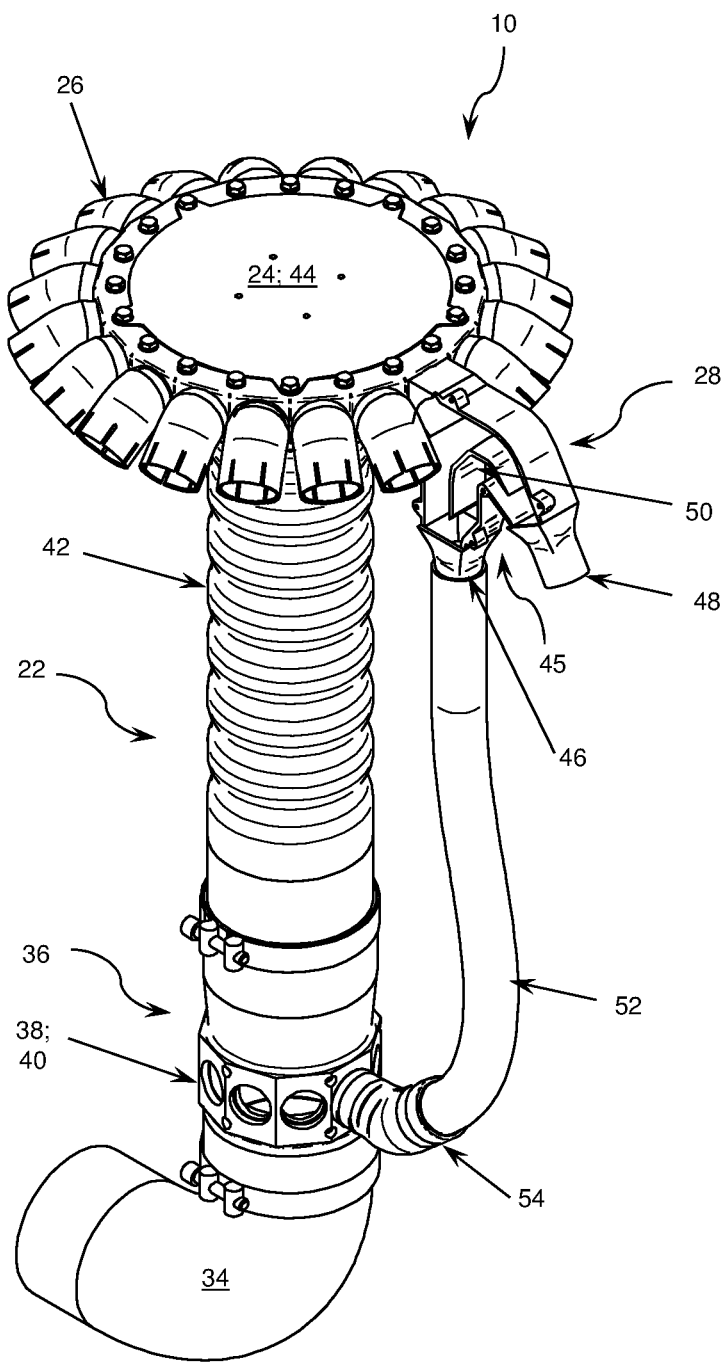
FIG. 2A shows a perspective view of a distribution tower.
Figure 2B:
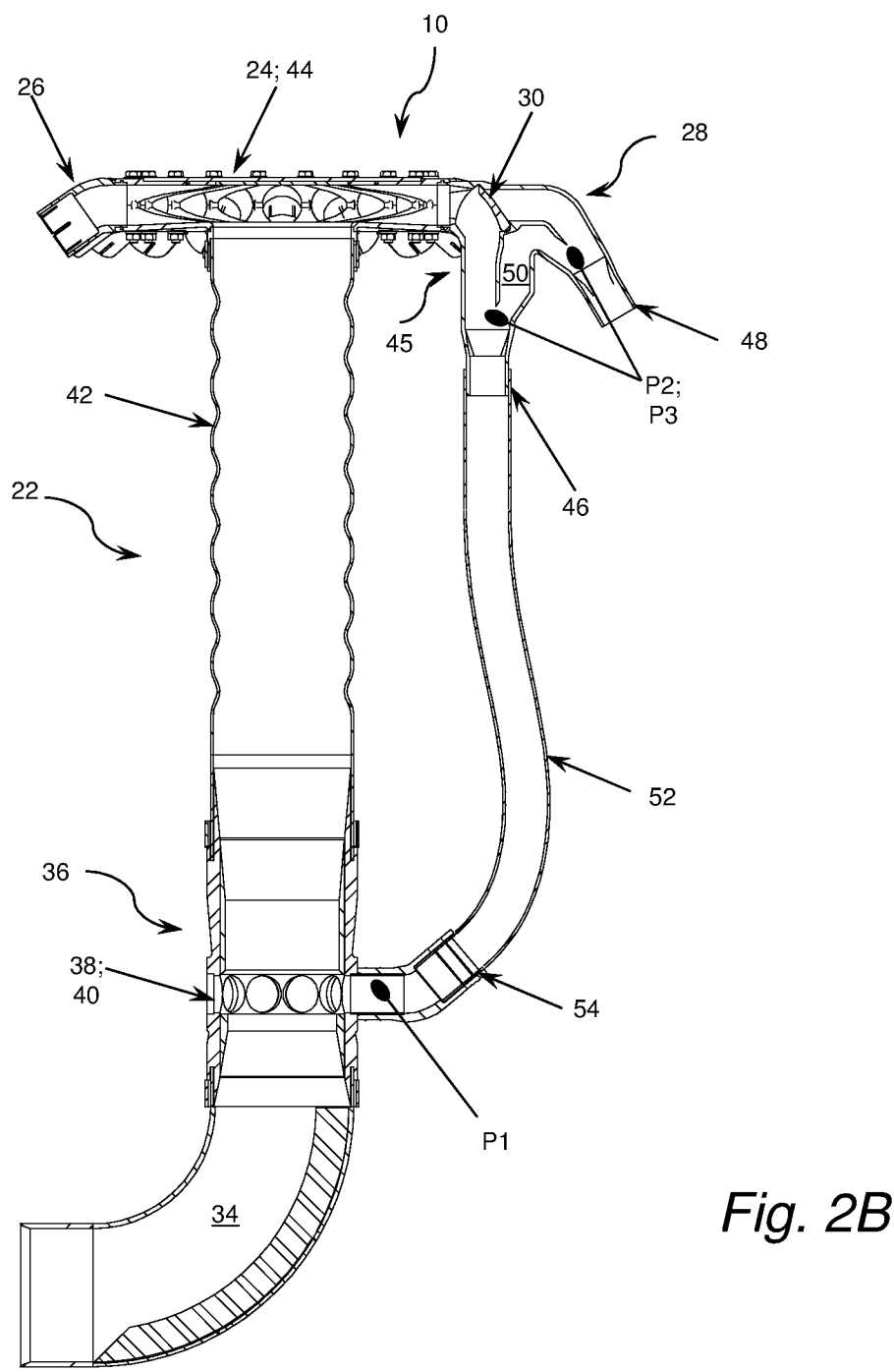
FIGS. 2B and 2C show a seed distribution tower with different positions of a track switch in two cross-sectional side views.
Figure 2C:
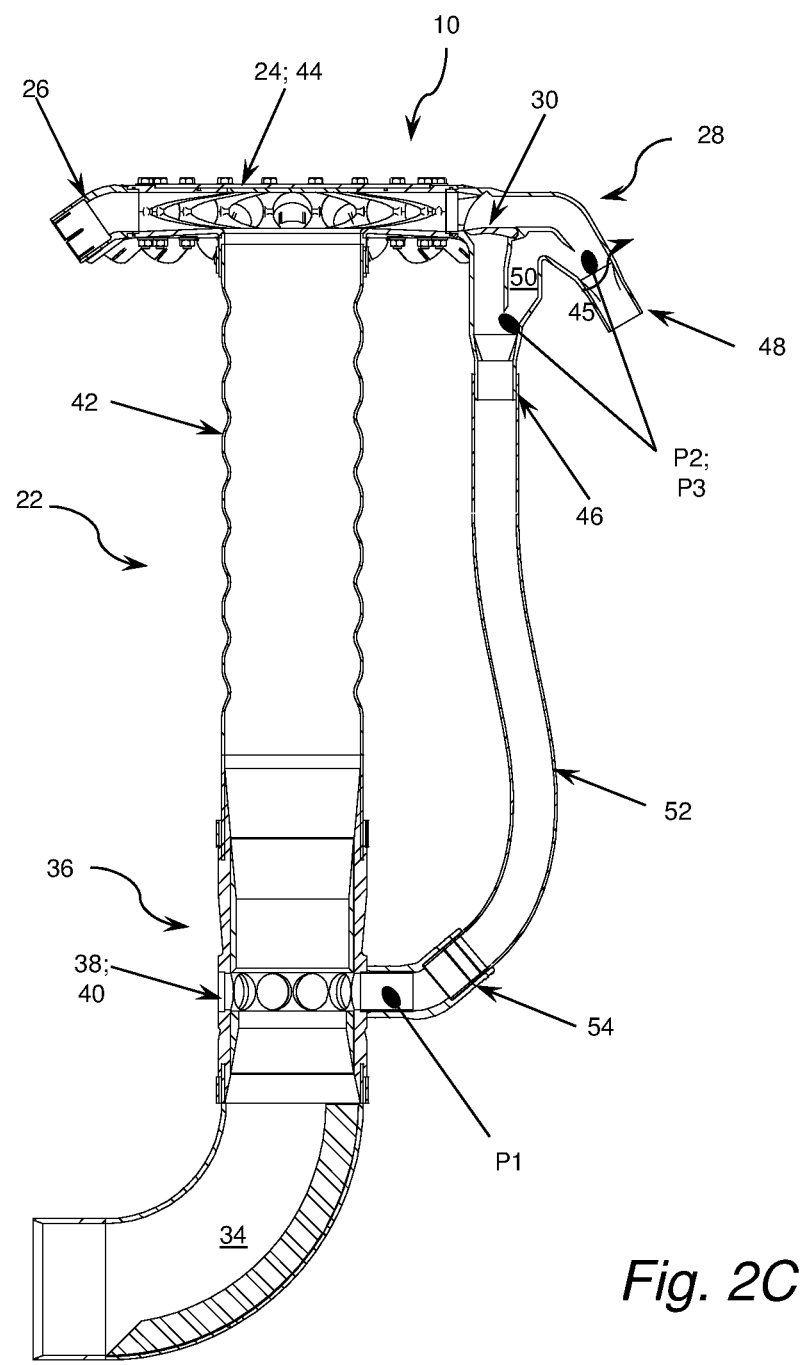
Figure 3B:
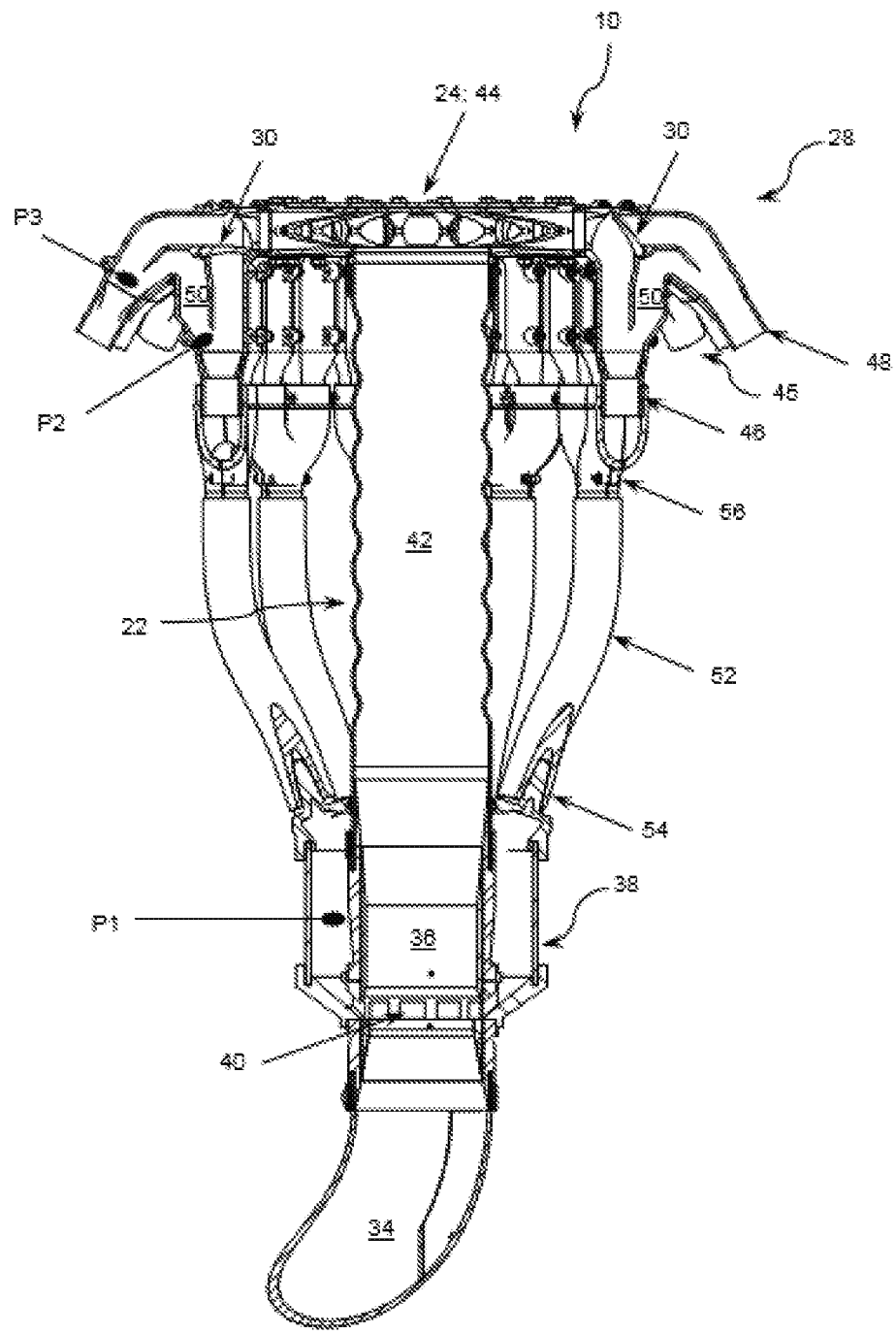
FIG. 3B shows a further embodiment variant of a distribution tower with different positions of a track switch in a cross-sectional side view.

FIGS. 2A, 2B, and 2C show an embodiment variant of a distribution tower 10 according to the invention in various views, with FIG. 2A illustrating the distribution tower 10 in a perspective view and the FIGS. 2B and 2C illustrating it in a cross-sectional side view. The distribution tower 10 essentially comprises of a riser pipe 22, to the top end of which a distributor head 24 connects. A plurality of outflows or rows 26, as the case may be, are disposed evenly spaced along the circumference of the distributor head 24. The distribution tower 10 first has a transition piece 34 that is arc-shaped. A change of direction of the air volume flow of distribution goods from a substantially horizontal into a vertical direction of flow is achieved by means of said transition piece 34. A riser pipe 22 connects to the transition piece 34. The riser pipe 22 consists of different sections. To begin with, the riser pipe 22 has a nozzle 36. The cross section of the riser pipe 22 is first conically reduced and subsequently conically increased by means of said nozzle 36. Return devices 38 in the form of ring-shaped openings 40 are arranged at the location with the smallest cross section. The cross section reduction is intended for centering the air volume flow of distribution goods in the riser pipe 22. This is to be even further improved by a corrugated pipe 42 connecting to the nozzle 36. Other pipes with cross section reductions would also be conceivable apart from a corrugated pipe 42, for example such pipes as have recesses. It would also be conceivable to exchange the corrugated pipe 42 for a further nozzle 36, for example, such that the riser pipe is composed of two or more nozzles, for example. The individual sections of the riser pipe 22 can be in each case connected by way of welding or by means of clamps, for example. The sections can moreover be formed from a metallic or from a non-metallic material. In addition, the riser pipe 22 could be manufactured in one piece and made from plastic material, for example.

A circular distributor head 24 connects to the top end of the riser pipe 22. Said distributor head 24 has a flat cover 44 in the exemplary embodiment of FIG. 2. The distributor head 24 could, however, also have many other forms, and could be, for example, mushroom-shaped or the like. In the distributor head 24, the air volume flow of distribution goods is redirected from a vertical direction to a horizontal direction toward the outflows 26, and for this purpose, the distribution goods can impact with the cover 44, for example, and are subsequently guided toward the outflows 26 by the air volume flow. The more uniform this distribution between the outflows 26 is, the more uniform is the lateral distribution of the distribution goods at the agricultural distribution machine.

In order to be able to switch off or cut off, as the case may be, the dispensing of distribution goods in individual outflows 26, at least one of the outflows 26 has a shut-off device 28 associated with it. A pivotable track switch 30 is disposed within said shut-off device. In this instance, the track switch 30 can be pivoted, for example, by means of an electric and/or pneumatic and/or hydraulic and/or the like actuator between a shut position (cf. FIG. 2B) and an open position (cf. FIG. 2C). Besides a track switch 30, the shut-off device 28 further has a return section 45 in the form of a return connection 46, and has a seed tube connection 48 as well as a bypass 50. A return tube 52 is connected to the return connection 46, with the return tube 52 leading with its bottom end via a spout 54 into the return device 38.

If the track switch 30 is, for example, closed (cf. FIG. 2B), the air volume flow of distribution goods in the shut-off device 38 is redirected toward the return section 45 and subsequently guided via a return tube 52 mounted to the return connection 46 and via the return device 38 back into the riser pipe 22. The returned distribution goods are subsequently received into the air volume flow of distribution goods in the riser pipe 22 again, and then conveyed to the distributor head 24 and to the outflows 26 again.

While a pivotable flap is shown as track switch 30 in the context of the presently described exemplary embodiment, the track switch 30 can for all intents and purposes also have different designs. For example, a ball valve or the like is suitable as motor-adjustable track switch 30.

In order to achieve a desired lateral distribution result even with a plurality of track switches 30 shut-off, it is necessary that, despite the track switches 30 being shut-off, an at least substantially same or uniform pressure level or a substantially same or uniform air volume flow or substantially same or uniform flow velocities, as the case may be, prevail in each case in the components of the distribution tower 22, independently of the position of the track switch 30. In order to achieve this result, the riser pipe 22, the distributor head 24, the return device 38, the return section 45, the bypass 50, as well as the seed tube connection 48 are permanently pneumatically connected, independently of the position of the track switch 30. In particular, this is ensured by the bypass 50 that is located in the shut-off device 28. In this way, various pressure levels are reached in the distribution tower 24, with a pressure level P1 resulting in the return device 38, and with a pressure level P2 and/or P3 resulting in the shut-off device 28 or in the bypass 50, as the case may be, and with P1 in this context being less than or equal to P2 and/or P3.

FIGS. 3A and 3B show another exemplary embodiment of a distribution tower 10 of an agricultural distribution machine, with FIG. 3A showing the distribution tower 10 in a perspective view and FIG. 3B showing it in a cross-sectional side view. The distribution tower 10 essentially consists of a riser pipe 22, to the top end of which a distributor head 24 connects. A plurality of outflows or rows 26, as the case may be, is disposed evenly spaced along the circumference of the distributor head 24. The distribution tower 10 first has a transition piece 34 that is arc-shaped, with a reversal of direction of the air volume flow of distribution goods from a substantially horizontal into a vertical direction of flow being achieved by means of said transition piece 34. A riser pipe 22 connects to the transition piece 34, with the riser pipe 22 first having a nozzle section or a nozzle 36, as the case may be. The cross section of the riser pipe 22 is conically reduced and subsequently conically increased by means of said nozzle 36. The nozzle 36 is intended for centering the air volume flow of distribution goods in the riser pipe 22, whereby a subsequently even distribution of the distribution goods in the distributor head 24 is to be improved. Said centering is to be further improved by a pipe section that is designed as corrugated pipe 42 disposed downstream from the nozzle in the exemplary embodiment. Other pipe sections with cross section reductions would also be conceivable apart from a corrugated pipe 42, for example such pipes as have in each case only individual recesses. It would also be conceivable to exchange the corrugated pipe 42 for a further nozzle 36, for example, such that the riser pipe 22 is composed of two or more nozzles, for example. The individual sections of the riser pipe 22 can be in each case connected by way of welding or by means of clamps, for example. The sections can moreover be formed from a metallic or from a non-metallic material. In addition, the riser pipe 22 could be manufactured in one piece and made from plastic material, for example.

A circular distributor head 24 having a flat cover 44 connects to the top end of the riser pipe 22. In the distributor head 24, the air volume flow of distribution goods is redirected from a vertical direction to a horizontal direction toward the outflows 26, and for this purpose, the distribution goods can impact with the cover 44, for example, and are subsequently guided toward the outflows 26 by the air volume flow. The more uniform this distribution between the outflows 26 is, the more uniform is the lateral distribution of the distribution goods at the agricultural distribution machine.

In order to be able to switch off or cut off, as the case may be, the dispensing of distribution goods in individual outflows 26, each of the outflows 26 has a shut-off device 28 associated with it. A pivotable track switch 30 is disposed within said shut-off device. The track switch 30 can be pivoted, for example, by means of an electric and/or pneumatic and/or hydraulic and/or the like actuator between a shut position (cf. FIG. 3B, right side) and an open position (cf. FIG. 3B, left side). Besides a track switch 30, the shut-off device 28 further has a return section 45 consisting of a return connection 46, and has a seed tube connection 48 as well as a bypass 50. First, a collecting piece 56 is connected to the return connection 46. Said collecting piece 56 is designed to be y-shaped in the exemplary embodiment, and it connects in each case two return connections 46 or two shut-off devices 28, as the case may be. A return tube 52 is moreover connected to the collecting piece 56, with the return tube 52 leading with its bottom end via a spout 54 into the return device 38. The number of return tubes 52 can be substantially reduced by using the collecting pieces 56, with at least two, but also more return tubes 52 being potentially connected here.

The return device 38 is formed by a circular pipe surrounding the nozzle 36 or the riser pipe 22, as the case may be, with a multitude of rectangular openings 40 being associated with the nozzle 36 in the area of its smallest circumference, which openings 40 establish a connection between the riser pipe 22 or the nozzle 36, as the case may be, and the return device 38. The arrangement of the openings 40 in the area of the nozzle 36 results in a suction effect at the openings, whereby the seed return from the return device 38 into the riser pipe 22 is further improved.

When the track switch 30 is shut (right side in FIG. 3B), the air volume flow of distribution goods in the shut-off device 38 is redirected toward the return section 45, and is guided back into the riser pipe 22 by means of the return connection 46, the collecting pieces 56, the return tube 52, and the return device 38. The returned distribution goods are subsequently conveyed by the air volume flow of distribution goods in the riser pipe 22 to the distributor head 24 and to the outflows 26 again.

In order to still achieve a desired lateral distribution result even with at least one shut track switch 30, it is necessary that, despite the track switch 30 being shut-off, the pressure P1 in the return device 38 or at the spout 54, as the case may be, is less than or equal to the pressure P2/P3 in the bypass 50 or in the return section 45, as the case may be.

In order to achieve this result, the riser pipe 22, the distributor head 24, the return device 38, the return section 45, the bypass 50, as well as the seed tube connection 48 are permanently pneumatically connected, independently of the placing or position of the track switch 30, as the case may be. In particular, this is ensured by the bypass 50 that is located in the shut-off device 28. In this way, various pressure levels are reached in the distribution tower 24, with a pressure level P1 resulting in the return device 38, and with a pressure level P2 or P3 resulting in the shut-off device 28 or in the bypass 50, respectively, and with P1 largely being less than or equal to P2 and P3, independently of the number of shut track switches 30.

The pressure connection in the distribution tower 10 is once more illustrated by the lines in FIG. 3A, with a pressure level P1 prevailing in the return device 38 surrounding the riser pipe 22. By means of the spouts 54 mounted along the circumference of the return device 38, by means of the return tube 52, of the collecting pieces 54, of the return connections 46, as well as by means of the bypass 50, a pneumatic connection is in each case established between these components, whereby a pressure level in each case of P2 and/or P3 is reached in the shut-off devices 28. Said pressure level also prevails, in particular, in the area of the seed tube connection 48, with P1 in this context again in each case largely being less than or equal to P2 and/or P3, independently of the number of shut track switches 30 or outflows 26, as the case may be. It is thus possible to connect an optional number of outflows 26 to the distribution tower 10 without the lateral distribution perceptibly changing.

In order to achieve even better results, the amount of distribution goods metered from the metering device 16 into the duct system can be reduced in each case depending on the number of shut outflows 26, with this being only necessary from a certain number of shut outflows 26 onward, for example from five outflows 26 onward.

Figure 4A:
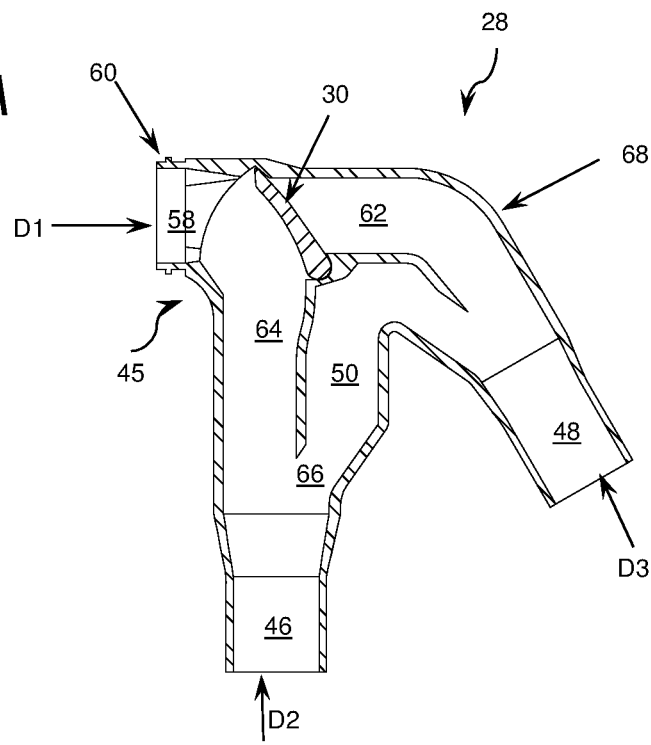
FIGS. 4A and 4B show an exemplary embodiment of a shut-off unit with different positions of a track switch.
Figure 4B:
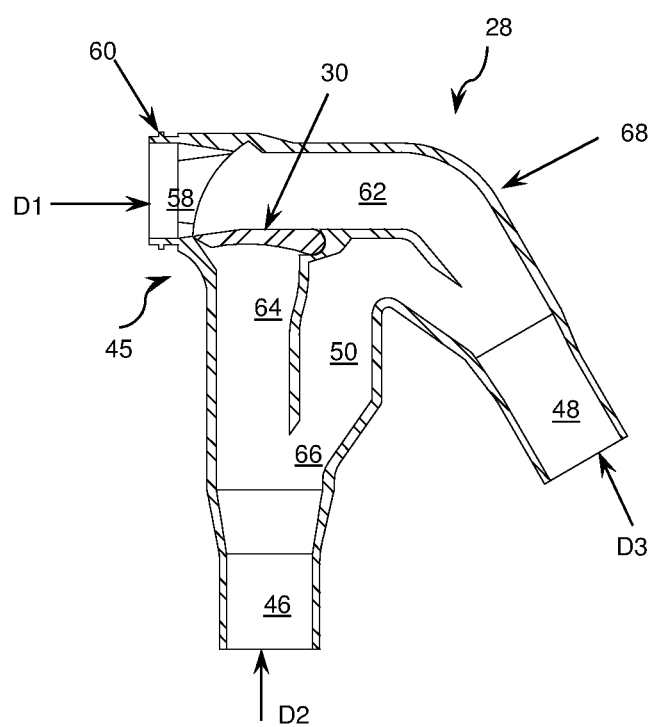

A possible design for a shut-off device 28 with integrated track switch 30 follows from FIGS. 4A and 4B, with the track switch 30 being represented in a shut position in FIG. 4A and in an open position in FIG. 4B. The shut-off device 28 consists of a flange surface 58 for mounting to the particular outflows 26 of the distributor head 24. For this purpose, there are latching members 60, for example, disposed at the flange surface 58. Said latching members 60 allow for simple and quick mounting to the distributor head 24. The shut-off device moreover has a return section 45 being preferably composed of a return connection 46 and a return channel 64 extending between the flange surface 58 and the return connection 46, and also has a seed tube connection 48 and a seed channel 62 extending between the flange surface 58 and the seed tube connection 48, with a bypass 50 moreover extending between the return connection 46 and the seed tube connection 48. The flange surface 58, the return connection 46, as well as the seed tube connection 48 have an essentially same outer diameter D1; D2; D3 of, for example, 30 millimeters, while said diameters could also be selected to be larger or smaller and could differ from each other.

Following the flange surface 58, there is a track switch 30 that can be pivoted between a shut position (cf. FIG. 4A) and an open position (cf. FIG. 4B). Said pivoting is carried out preferably by means of an electric and/or pneumatic and/or hydraulic and/or the like actuator. The control of the actuator can be carried out, for example, by means of the computer unit located at the agricultural machine. The computer unit can in turn transmit corresponding signals to the actuator by manual input, for example, or based on GPS data. The air volume flow of distribution goods can be conveyed according to the position of the track switch 30; with an open position, it can be conveyed toward the seed tube connection 48 as well as toward a spreading device, and with a shut position, it can be conveyed toward the return connection 46 as well as toward the riser pipe 22.

The seed channel 62 and the return channel 64 can be disposed at right angles to each other, and the seed channel 62 can in turn be disposed to be horizontal to the flange surface 58 and the return channel 64 can be disposed perpendicular to the flange surface 58. In the exemplary embodiment of FIGS. 4A and 4B, the seed channel 62 and the return channel 64 are furthermore substantially pneumatically separated by way of the track switch 30, although this is not absolutely necessary, since the track switch can also serve as bypass if accordingly designed.

A portion of bypass 50 extends parallel to the seed channel 62 and another portion of the seed channel 62 extends parallel to the return channel 64, with said bypass 50 pneumatically connecting the return connection 46 as well as the seed tube connection 48. The bypass is disposed such that it forms a separator or a separating section 66, as the case may be, in the form of a deflection separator. In this instance, the deflection separator has an angle of approximately 180°, whereby the distribution goods are prevented from escaping via the bypass. The degree of separation has to be as high as possible in this context, so that the distribution goods are guided back toward the return connection 46 into the riser pipe 22 when the track switch 30 is shut, while the air volume flow, however, can escape via the bypass 50 toward the seed tube connection 48. The separation of distribution goods from a part of the air volume flow is achieved by way of the separating section 66.

The bypass 50 has a cross section that is selected such that the flow resistance is as far as possible the same for the bypass 50 with the track switch 30 shut as for the seed channel 62 with the track switch 30 open. In this context, the cross section or the width of the bypass 50, as the case may be, is, for example, 30 millimeters or 25 millimeters or 20 millimeters. Thus, the flow resistance, for example, in a path along the flange surface 58, the return channel 64, the separating section 66, the bypass 50, and the seed tube connection 48 is substantially the same as a flow resistance in a path along the flange surface 58, the seed channel 62, and the seed tube connection 48.

The outer contour of the seed channel 62 moreover has a deflection contour 68. A change of direction of the air volume flow of distribution goods, for example from a horizontal direction to a direction along the seed tube, is achieved by said deflection contour 68. An impact sensor, for example, could be associated with said deflection contour 68, with the number and/or amount of passing grains of distribution goods being determined by means of the impact sensor. Optical sensors could also be provided in this context. In a preferred embodiment, the position of the track switch 30 could be adjusted corresponding to the sensor values, that is to say that if the sensor determines that a desired amount of distribution goods has been exceeded, the track switch 30 shuts or assumes a position, as the case may be, where more distribution goods are guided toward the return section 45, and vice versa.

Figure 5:
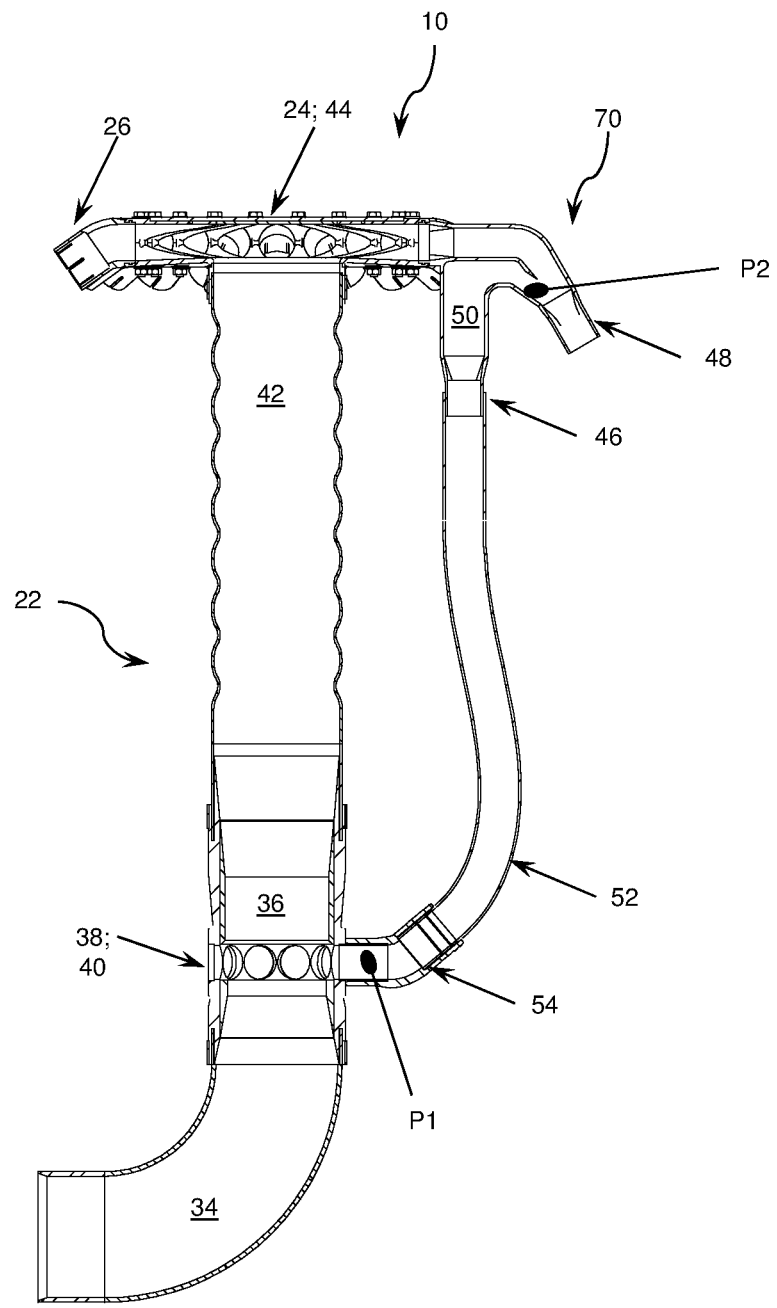
FIG. 5 shows a further embodiment variant of a distribution tower without a track switch in a cross-sectional side view.

FIG. 5 shows a further embodiment variant of a distribution tower 10 according to the invention, this embodiment having a pressure compensation device 70 (cf. FIG. 2). The distribution tower 10 essentially consists of a riser pipe 22, to the top end of which a distributor head 24 connects. A plurality of outflows 26 is disposed evenly spaced along the circumference of the distributor head 24. The distribution tower 10 first has a transition piece 34 that is arc-shaped. A change of direction of the air volume flow of distribution goods from a substantially horizontal into a vertical direction of flow is achieved by means of said transition piece 34. A riser pipe 22 connects to the transition piece 34. The riser pipe 22 consists of different sections. To begin with, the riser pipe 22 has a nozzle 36. The cross section of the riser pipe 22 is first conically reduced and subsequently conically increased by means of said nozzle 36. Return devices 38 in the form of ring-shaped openings 40 are arranged at the location with the smallest cross section. The cross section reduction is intended for centering the air volume flow of distribution goods in the riser pipe 22. This is to be even further improved by a corrugated pipe 42 connecting to the nozzle 36. Other pipes with cross section reductions would also be conceivable apart from a corrugated pipe 42, for example such pipes as have in each case only individual recesses. It would also be conceivable to exchange the corrugated pipe 42 for a further nozzle 36, for example, such that the riser pipe 22 is composed of two or more nozzles, for example.

A circular distributor head 24 connects to the top end of the riser pipe 22. Said distributor head 24 has a flat cover 44 in the exemplary embodiment of FIG. 5. The distributor head 24 could, however, also have many other forms, and could be, for example, mushroom-shaped or the like. In the distributor head 24, the air volume flow of distribution goods is redirected from a vertical direction to a horizontal direction toward the outflows 26, and for this purpose, the distribution goods can impact with the cover 44, for example, and are subsequently guided toward the outflows 26 by the air volume flow. The more uniform this distribution between the outflows 26 is, the more uniform is the lateral distribution of the distribution goods of the agricultural distribution machine.

In order to achieve a desired lateral distribution result independently of external influences, such as seed tube lengths or the like, it is necessary to establish an at least substantially same or uniform pressure level or substantially same or uniform air volume flows or substantially same or uniform flow velocities, as the case may be, in each case in the components of the distribution tower 22. In order to achieve this result, the riser pipe 22, the return device 38, the bypass 50, as well as the seed tube connection 48 are permanently pneumatically connected. In this way, various pressure levels are reached in the distribution tower 24, with a pressure level P1 resulting in the return device 38 in this context, and with a pressure level P2 and/or P3 resulting in the pressure compensation device 70, and with P1 in this context being less than or equal to P2 and/or P3.

The pressure compensation device 70 shown in this exemplary embodiment could be combined, in particular, in connection with the shut-off devices 38 shown in FIGS. 2 to 4, so that only a small number of outflows 26 of a distribution tower 10, for example, are provided with shut-off devices 28, and the remaining outflows 26 are each provided with pressure compensation devices 70. The benefit herefrom would be that the distribution tower 10 would still have all advantages of the pressure levels that are reached, but could be constructed in a substantially simpler manner, since only a small number of outflows would have to be provided with track switches 30 and corresponding actuators.

The invention has been described with reference to a preferred embodiment. Those skilled in the art will appreciate that numerous changes and modifications can be made to the preferred embodiments of the invention and that such changes and modifications can be made without departing from the spirit of the invention. It is therefore intended that the appended claims cover all such equivalent variations as fall within the true spirit and scope of the invention.

LIST OF REFERENCE CHARACTERS

10 Distribution tower
12 Agricultural machine
14 Storage hopper
16 Metering device
18 Duct system
20 Air blower
22 Riser pipe
24 Distributor head
26 Outflow, row
28 Shut-off device
30 Track switch
32 Seed tube
34 Transition piece
36 Nozzle
38 Return device
40 Opening
42 Corrugated pipe
44 Cover
45 Return section
46 Return connection, return opening
48 Seed tube connection
50 Bypass
52 Return tube
54 Spout 56 Collecting piece
58 Flange surface
60 Latching member
62 Seed channel
64 Return channel
66 Separating section
68 Deflection contour
70 Pressure compensation device

The invention claimed is:

1. A distribution tower for an agricultural distribution machine for spreading granular distribution goods, the distribution tower comprising a riser pipe- for supplying an air volume flow of distribution goods to a distributor head connected to the riser pipe at an upper end thereof, with the distributor head dividing the air volume flow of granular distribution goods into a multitude of partial air volume flows of granular distribution goods corresponding to a number of outflows distributed along a circumference of the distributor head, wherein at least one of the outflows has a shut-off device associated therewith; wherein the shut-off device has a track switch by means of which the particular partial air volume flow of granular distribution goods can be guided toward a seed tube connection associated with the shut-off device or toward a return section associated with the shut-off device; wherein a return device connects to the return section, with the return device surrounding the riser pipe or being part of the riser pipe; and wherein the riser pipe has openings extending therethrough, in flow communication with the return device, the openings serving for receiving the granular distribution goods returned through the return device, wherein the riser pipe, the return device, and the return section, as well as the seed tube connection are permanently pneumatically connected, independently of the particular position of the track switch, wherein the return section is connected to the seed tube connection by a bypass including a separator section extending vertically from an opening between the bypass and the return channel.

2. The distribution tower as recited in claim 1 wherein the return section has a return connection and a return opening and a funnel-shaped member.

3. The distribution tower as recited in claim 1 wherein a collecting piece and a return tube and a funnel-shaped member connect to the return section and form a return device and lead into such return device.

4. The distribution tower as recited in claim 1 wherein the connection between the return section and the seed tube connection is achieved by means of a bypass.

5. The distribution tower as recited in claim 4 wherein slits and/or holes and/or openings serving as the bypass are associated with the track switch.

6. The distribution tower as recited in claim 4 wherein slits and/or holes and/or openings serving as the bypass are associated with a partition wall between the return section and the seed tube connection.

7. The distribution tower as recited in claim 4 wherein the bypass is designed as a pipeline or tubing, or in that the bypass is integrated as an air channel into the shut-off device or into the distributor head.

8. The distribution tower as recited in claim 1, wherein a pressure level P1 is applied in the return device, as well as a pressure level P2 and P3 being applied in the return section and respectively in the bypass, wherein P1 is less than or equal to P2 and P3.

9. The distribution tower as recited in claim 1 wherein the riser pipe has a section of reduced cross-section forming at least one nozzle and the openings extending through the riser pipe extend through the nozzle.

10. The distribution tower as recited in claim 1 wherein the shut-off device comprises at least of a flange surface, a return section, which preferably comprises of a return connection and a return channel extending between the flange surface and the return connection, a seed tube connection, and a seed channel-extending between the flange surface and the seed tube connection, and wherein a bypass extends between the return connection and the seed tube connection.

11. The distribution tower as in claim 1 wherein the air volume flow flowing from the return channel into the separator section undergoes a change in direction greater than 135°.

12. The distribution tower as recited in claim 1 wherein the bypass has a flow resistance that is largely identical to the flow resistance prevailing at the seed tube connection when the track switch is in an open position.

13. The distribution tower as recited in claim 1 wherein sensors are associated with the shut-off device with the number or the amount of passing grains of the distribution goods being determined by means of said sensors.

14. The distribution tower as recited in claim 13 wherein the position of the track switch is modified based on the number and/or on the amount of passing grains of the distribution goods.

15. The distribution tower as recited in claim 1 wherein the shut-off device and the return section are integrated into the distributor head.

16. An improved shut-off device for a distribution tower of an agricultural distribution machine for spreading granular distribution goods with a riser pipe for supplying the distribution goods to a distributor head connected at the top to the riser pipe, with the distributor head serving for dividing the air volume flow of granular distribution goods into a multitude of partial air volume flows of granular distribution goods corresponding to a number of outflows distributed along a circumference of the distributor head, wherein each of said outflows has one of the shut-off devices associated therewith, wherein each shut-off device has a track switch through which an air volume flow of granular distribution goods can be guided toward a seed tube connection associated with the shut-off device or toward a return section associated with the shut-off device; wherein a return device connects to the return section; wherein the return device surrounds the riser pipe or is formed as part of said riser pipe; and wherein the riser pipe has openings extending therethrough, in flow communication with the return device, the openings serving for receiving the granular distribution goods returned through the return device, wherein, in the improved shut-off device, the riser pipe, the return device, and the return section, as well as the seed tube connection are permanently pneumatically connected, independently of the position of the track switch, by a bypass pneumatically connecting the return section to the seed tube connection, the bypass including a separator section extending vertically from an opening between the bypass and the return section, whereby a pressure level P1 results in the return device, and a pressure level P2 and P3 result in the return section and in the bypass respectively, wherein P1 is less than or equal to P2 and P3 respectively.

17. The improved shut-off device as in claim 16 wherein sensors are associated with the shut-off device or with the seed tube or with the return section, with the number or the amount of passing grains of distribution goods being determined by means of said sensors.

18. The improved shut-off device as in claim 16 wherein the position of the track switch is modified based on the number or the amount of passing grains of the distribution goods.

19. The improved shut-off device as in claim 16 wherein the track switch is pivoted by means of an electric or pneumatic or hydraulic actuator.

20. The improved shut-off device as in claim 16 wherein the control of the track switch is carried out by means of a computer unit, with the computer unit transmitting signals by manual input or based on GPS data to the actuator.

21. A distribution tower for an agricultural distribution machine for spreading granular distribution goods, the distribution tower comprising a riser pipe for supplying an air volume flow of granular distribution goods to a distributor head connected to the riser pipe with the distributor head dividing the air volume flow of granular distribution goods into a plurality of partial air volume flows of granular distribution goods corresponding to a number of outflows distributed along a circumference of the distributor head, wherein at least one of the outflows has a shut-off device connected thereto; wherein the shut-off device includes a seed channel, a bypass channel and a return channel formed therein with the seed channel connected between an inlet passage and a seed channel outlet, the return channel connected between said inlet passage and a return channel outlet, and the bypass channel connected between the seed channel and the return channel; a track switch is pivotably mounted within the shut-off device and pivotable between an open position in which the track switch closes off the return channel from the inlet passage while leaving the seed channel open to the inlet passage such that a partial air volume flow of granular distribution goods entering the inlet passage is guided from the inlet passage through the seed channel toward a seed tube connection of the shut-off device and a closed position in which the track switch closes off the seed channel from the inlet passage while leaving the return channel open to the inlet passage such that the partial air volume flow of granular distribution goods entering the inlet passage is guided from the inlet passage through the return channel toward a return connection of the shut-off device to which a return line is connected for delivering the partial air volume flow of granular distribution goods to a return device surrounding the riser pipe and wherein the riser pipe has openings extending therethrough, in flow communication with the return device through which the granular distribution goods in the partial air volume flow from the return channel re-enter the riser pipe, wherein the riser pipe, the return device, the return channel and the seed channel are pneumatically connected through the bypass channel independent of the position of the track switch.

22. The distribution tower as in claim 21 wherein the track switch is pivotally connected to a divider separating the seed channel and the return channel from the bypass channel.

23. The distribution tower as in claim 21 wherein a first portion of the bypass channel extends parallel to the return channel.

24. The distribution tower as in claim 21 wherein a first portion of the bypass channel extends parallel to the return channel and a second portion of the bypass channel extends parallel to the seed channel.

25. The distribution tower as in claim 21 wherein the bypass channel opens into the return channel at a bypass return channel opening and into the seed channel at a bypass seed channel opening, and the bypass channel includes a separating section extending vertically from the bypass return channel opening.

26. The distribution tower as in claim 25 wherein a flow path of a portion of the air volume flow flowing from the inlet passage through the return channel and into the separating section of the bypass channel undergoes a change in direction of greater than 90° relative to the flow path of the air volume flow flowing through the return channel.

27. The distribution tower as in claim 25 wherein a flow path of a portion of the air volume flow flowing from the inlet passage through the return channel and into the separating section of the bypass channel undergoes a change in direction of greater than 135° relative to the flow path of the air volume flow flowing through the return channel.

28. The distribution tower as in claim 25 wherein a flow path of a portion of the air volume flow flowing from the inlet passage through the return channel and into the separating section of the bypass channel undergoes a change in direction of approximately 180° relative to the flow path of the air volume flow flowing through the return channel.

* * * * *